United States Patent [19]

Lowenson et al.

[11] Patent Number: 4,935,881

[45] Date of Patent: Jun. 19, 1990

[54] METHOD AND APPARATUS FOR TESTING MISSILE SYSTEMS

[76] Inventors: Jeffrey Lowenson; Khosrow Hessamian, both of 22544-3 Jeffrey Mark Ct., Chatsworth, Calif. 91311

[21] Appl. No.: 38,253

[22] Filed: Apr. 14, 1987

[51] Int. Cl.⁵ ............................................. G06F 15/20
[52] U.S. Cl. ................................ 364/550; 364/551.01; 364/578; 364/579; 364/920; 364/925.1
[58] Field of Search ............... 364/550, 423, 602, 900, 364/551.01, 578, 579, 580, 443; 340/945; 369/21; 360/5; 73/769, 583, 560

[56] References Cited

U.S. PATENT DOCUMENTS

| | | | |
|---|---|---|---|
| 3,501,750 | 3/1970 | Webbe et al. | 364/900 |
| 3,535,683 | 10/1970 | Woods et al. | 364/900 |
| 4,409,670 | 10/1983 | Herndon et al. | 360/5 |
| 4,463,443 | 7/1984 | Frankel et al. | 364/900 |
| 4,480,480 | 11/1984 | Scott et al. | 73/769 |
| 4,621,335 | 11/1986 | Bluich et al. | 360/5 |
| 4,646,241 | 2/1987 | Ratchford et al. | 360/5 |

*Primary Examiner*—Parshotam S. Lall
*Assistant Examiner*—Ellis B. Ramirez

[57] ABSTRACT

A method and apparatus for testing missile software is disclosed. The appartus (10) comprises a missile data processor interface circuit (14) for interfacing the data processor (16) of the missile with the apparatus (10). The apparatus (10) further comprises a circuit (18) for real-time collection of information appearing on at least one of the memory buses of the missile data processor. The circuit (18) for real-time collection of data is in electrical communication with the data processor interface circuit (14) and a computer (24).

42 Claims, 10 Drawing Sheets

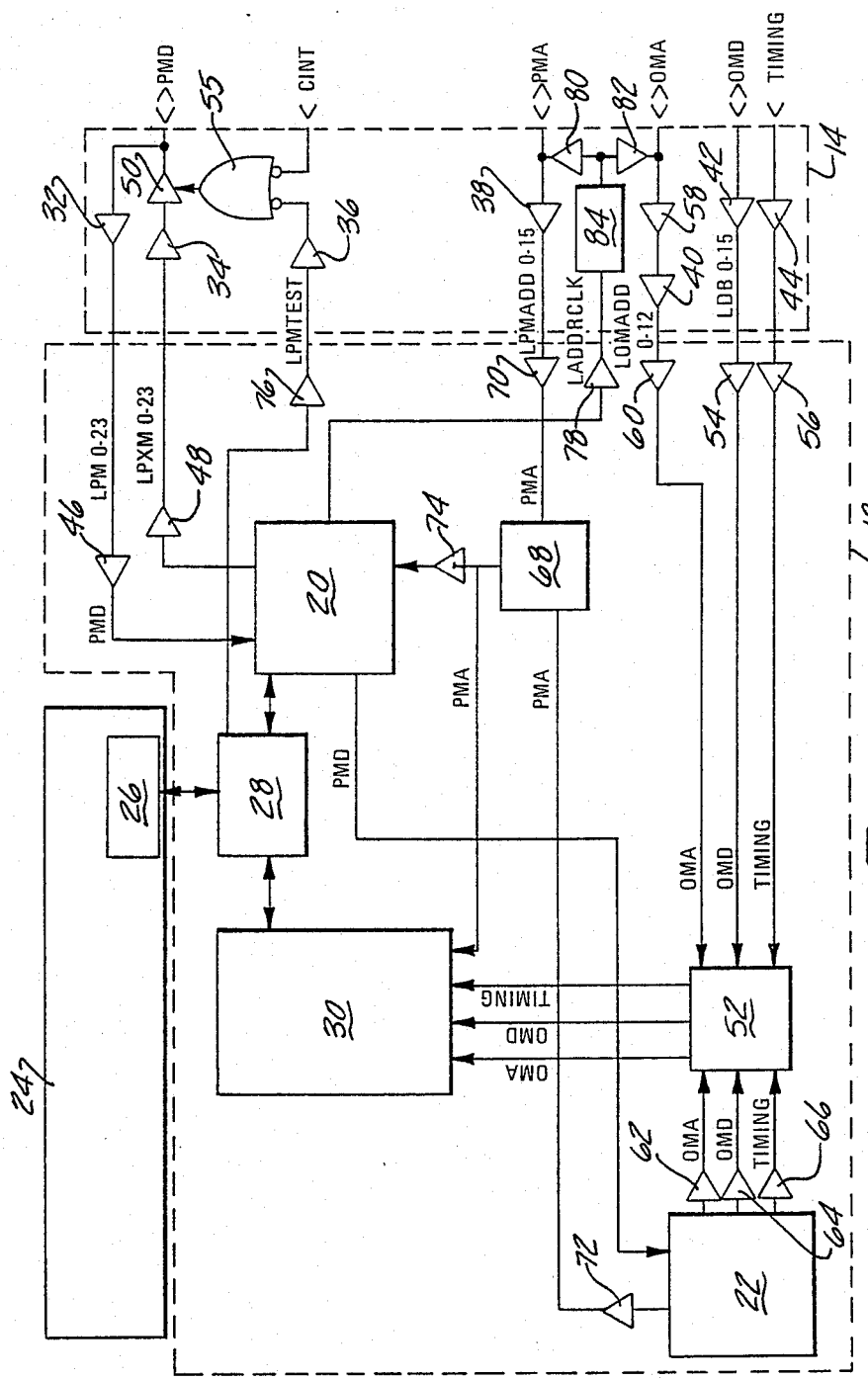

METHOD AND APPARATUS FOR TESTING MISSILE SYSTEMS

BACKGROUND OF THE INVENTION

1. Field of the Invention

This invention relates to the field of missile control and guidance systems, and more particularly to a method and apparatus for testing missile systems.

2. Description of Related Art

One area of particular importance in missile technology is that of missile guidance systems. These systems are used for controlling the direction of missiles in flight. Some guidance systems sense the contrast in emitted or reflected radiation between the target and the surroundings to control trajectory. These types of guidance systems are often used when the targets are either airplanes or ships. Other types of guidance systems use predetermined geographical or celestial information to guide missiles. In command guidance systems, a ground station or a plane tracks both the missile and target so as to be able to generate and transmit the appropriate instructions to direct the missile to the target. Other types of guidance systems, such as beam rider guidance systems, are also often used.

In some of the latest tactical missiles, such as AMRAAM and Phoenix, all means for tracking a maneuvering target and guiding the missile to the target are contained within the missile itself. Thus, a fighter pilot would typically acquire a target, launch a missile and then be free to engage other targets. "Smart" missiles, as described above, use one or more data processors (hereinafter "ADP") located within a missile to process information relating to missile and target trojectories. Each ADP executes a stored collection of programs which enable the ADP to send the appropriate control signals to various actuators which control missile flight. The ADPs are generally used in conjunction with a program memory and an operand memory. The program memory is used to store the instructions which are executed by the ADP, while the operand memory is used to store the data which the instructions in the program memory execute. The ADP communicates with the operand memory through an operand memory-data bus and an operand memory-address bus. Similarly, the ADP communicates with the program memory through a program memory-address bus and a program memory-data bus. Because missile guidance systems often require a relatively sophisticated analysis of data, the software used in connection with the ADP is often relatively complex and may involve a relatively long development time. One method for reducing the development time for ADP software is to use software emulating systems. Such software emulating systems generally emulate the activity of the ADP so that intermediate or terminal results can be compared with the expected results. By comparing the actual results with the expected results, it is possible to determine whether the software is properly functioning.

While such software emulating systems did reduce the development time for ADP software, they often did not provide several features which would further expedite ADP software development. For example, these systems did not allow real-time collection of information appearing in the various address and data buses. In addition, software emulating systems did not generally allow the contents of the program memory to be dumped onto an external memory so that the contents of the program memory could be examined. Further, because such software emulating systems did not generally permit in situ testing of the ADP software, it was not often possible to determine whether the ADP's program or operand memory was damaged during installation. Finally, such systems could not be used for testing the operability of the hardware which was controlled by the ADP.

SUMMARY OF THE INVENTION

According to the preferred embodiment of the present invention, a method and apparatus for testing missile systems is provided. The apparatus comprises a missile data processor interface means for interfacing the data processor of the missile with the apparatus. The apparatus further comprises means for real-time collection of information appearing on at least one of the memory buses of the missile data processor. The means for real-time collection of data is in electrical communication with the data processor interface means and a computer.

BRIEF DESCRIPTION OF THE DRAWINGS

Various advantages of the present invention will become apparent to one skilled in the art upon reading the following specification and by reference to the following drawings in which:

FIG. 2 is a diagrammatic illustration of the apparatus for testing systems shown in FIG. 1;

DESCRIPTION OF THE PREFERRED EMBODIMENTS

Figure 1:
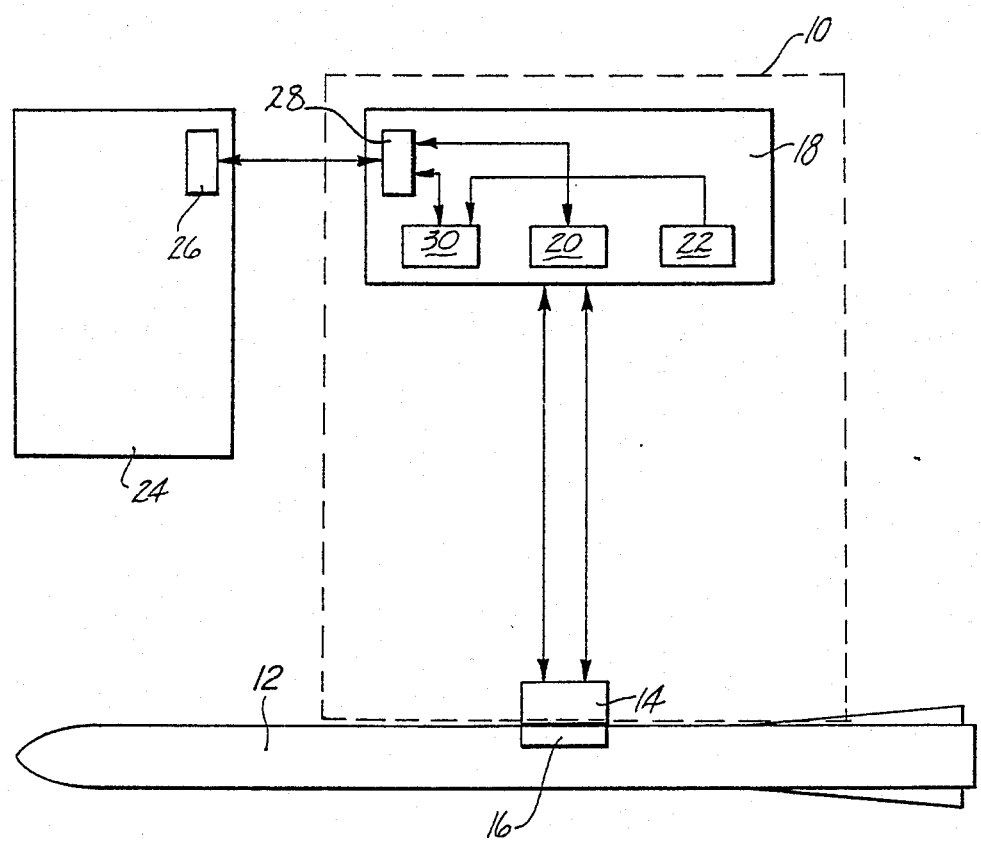
FIG. 1 is a diagrammatic illustration of the apparatus for testing missile systems made in accordance with the teachings of the preferred embodiment of the present invention shown in operative relationship with a missile and a computer.

Referring to FIG. 1, an apparatus 10 for testing missile systems is shown. The apparatus 10 electrically communicates with a missile 12 through the interface buffer 14 which provides means for interfacing the missile with the apparatus 10. The interface buffer 14 communicates with a data processor (hereinafter "ADP") 16 of the missile 12 in situ through the operand memory-data (hereinafter "OMD") bus, operand memory-address (hereinafter "OMA") bus, program memory-data (hereinafter "PMD") bus and program memory-address (hereinafter "PMA") bus of the missile 12. The interface buffer 14 is used to translate the logic levels associated with the ADP 16 into those which may be used by the other components of the apparatus 10 described below. To provide means for the real-time collection of data, the apparatus 10 further comprises a logical interface unit/external random access memory (hereinafter "LIU/XRAM") 18. The LIU/XRAM 18 receives real-time information from the missile 12 through the interface buffer 14. The LIU/XRAM 18 comprises an external random access memory (hereinafter "XRAM") 20 which may be used to store a program which is to be tested on the ADP 16 or on an ADP simulator described below. The XRAM 20 may comprise a 64K×24 bit memory array using 96 1MS1400−55 memory devices, although it is to be understood that other suitable memory storage devices may be used.

The LIU/XRAM 18 also comprises an ADP simulator 22. The ADP simulator 22 is used to simulate the response of the ADP 16 so that programs stored in the XRAM 20 can be tested using the ADP simulator 22 without requiring the ADP 16 to be present. The ADP simulator 22 comprises an 8 phase clock (not shown) which generates $C\phi0$–$C\phi3$ and CT0–CT3 sequential clock signals which simulate the $C\phi0$–$C\phi3$ and CT0–CT3 clock signals generated by the ADP 16. In addition, the ADP simulator 22 comprises a timing logic circuit (not shown) which uses the output from the 8-phase clock to generate read/write signals which simulate the operand memory read/write signals generated by the ADP 16. Finally, the ADP simulator 22 also comprises a plurality of counters (not shown) which are used for generating outputs which simulate the outputs from the OMA, OMD, and PMA buses.

To control the operation of the LIU/XRAM 18, a computer 24 is provided. The computer 24 includes an LIU interface module 26 which electrically communicates with a computer interface module 28 located within the LIU/XRAM 18. The computer interface module 28 provides means for interfacing the LIU/XRAM 18 and the computer 24 to allow the LIU/XRAM 18 and the computer 24 to communicate. While the computer 24 may be a PDP 11/44 and use the software contained in the microfiche appendix accompanying this specification, it will be understood that other suitable computers and software may be used.

The computer 24 generates various control signals which determine which information the LIU/XRAM 18 is to collect from the missile 12. These control signals are delivered by the computer 24 to the LIU/XRAM 18 and are decoded by a control strobe decode circuit described below into various register control logic (hereinafter "RLS") control signals. These RLS control signals are then used by the LIU/XRAM 18 to identify which information is to be collected from the missile 12. These RLS control signals and their respective functions are given in the table below:

| RLS | RLS CONTROL SIGNALS<br>FUNCTION |
|---|---|
| 0 | NO OPERATION |
| 1 | CLEAR LIU |
| 2 | NO OPERATION |
| 3 | SINGLE STEP |
| 4 | START ADP (LESTART) |
| 5 | STOP ADP (LEPAUSE) |
| 6 | NO OPERATION |
| 7 | LOAD 271CR REGISTER |
| 8 | INTERRUPT |
| 9 | LOAD 211CR REG |
| 10 | RESET MATCH TIMER & COUNTER |
| 11 | LOAD MATCH COUNT REGISTER |
| 12 | LOAD DMA START ADDRESS |
| 13 | LOAD DMA END ADDRESS |
| 14 | STROBE DMA COUNTER |
| 15 | LOAD 212CR REGISTER |
| 16 | LOAD 213CR REGISTER |
| 17 | RESET DAS SEQUENCER |
| 18 | RESET LATCH FLAG |
| 19 | NO OPERATION |
| 20 | LOAD PAUSE ADDRESS |
| 21 | LOAD LATCH ADDRESS |
| 22 | LOAD MATCH/TRACE ADDRESS |

| RLS | -continued<br>RLS CONTROL SIGNALS<br>FUNCTION |
|---|---|
| 23 | LOAD MASK REGISTER |
| 24 | NO OPERATION |
| 25 | LOAD 233CR REGISTER (TRACE CTL) |
| 26 | LOAD 231CR REGISTER (OMA/PMA, R/W) |
| 27 | LOAD 232CR REGISER (TRADE SEL) |
| 28 | RESET TRACE MEMORY AND GO |
| 29–31 | NOT USED |
| 32 | READ SELECT FROM LIU/XRAM |
| 33 | LOAD 351CR REGISTER (WRAPAROUND) |
| 34 | CLEAR ADP AND XRAM (LEMR) |
| 35 | NOT USED |
| 36 | NOT USED |
| 37 | NOT USED |
| 38 | NOT USED |
| 39 | NOT USED |
| 40 | ENTER COMPUTER READ MODE |
| 41 | LOAD XRAM ADDRESS |
| 42 | LOAD HIGH XRAM DATA (PMD 16-23) |
| 43 | LOAD LOW XRAM DATA |
| 44 | WRITE TO XRAM |
| 45 | DUMP ADP PROG MEMORY TO XRAM |
| 46 | SINGLE STEP ADDR. COUNTER OM DUMP |
| 47 | LEAVE COMPUTER READ MODE |
| 48–55 | NOT USED |
| 56 | LOAD FREQUENCY CODE 1 |
| 57 | LOAD FREQUENCY CODE 2 |

Some of the RLS control signals are used for loading control registers onto buses within the LIU/XRAM 18. These registers, together with the functions which result when certain bits in a given register are of a particular value, are given in the table that appears at the end of the specification.

The LIU/XRAM 18 further comprises a logical interface unit (hereinafter "LIU") 30 which permits collection of data from either the ADP 16 or the ADP simulator 22 which, because of the speed at which information is delivered in real-time from the ADF 16 and the ADP simulator 22, could not be collected by the computer 24 independently. The LIU 30 exerts control over both the ADP 16 and the ADP simulator 22 so as to permit the 24 to collect information from the OMA, OMD or PMA buses using either of four collection modes. In the pause mode, the LIU 30 generates a control signal which causes the ADP 16 to pause when a particular value appears on the oCMA, OMD, or PMA buses. In the match mode, the IJU 30 counts the number of occurrences that a particular value appears on either the OMA or the PMA buses. In the latch mode, the LIU 30 latches information which appears on the OMD bus when a particular value appears on either of the OMA or PMA buses. Finally, when the LIU 30 is in the trace mode, the LIU 30 collects what appears on either the PMA, OMA, or OMD buses which occurs before and after a certain event, such as when a particular value appears on the OMA bus. In addition to the above, the LIU 30 permits the collection of data when a combination of the above modes are used. For example, the latch mode and the pause mode may be used to determine the elapsed time between two events.

As shown in FIG. 2, the interface buffer 14 receives outputs from the PMA, OMA, and OMD buses. For purposes of this presentation only, the program memory-address bus and program memory-data bus will be referred to as PMA and PMD buses regardless of whether the signals have passed through the translator, receiver, etc. Similarly, the operand memory-address bus and the operand-data bus will be referred to as the program OMA and OMD buses respectively regardless of whether the information is delivered through a translator, receiver, etc. This convention will also be applied to the data buses in the LIU/XRAM 18, as well as to the outputs of the various components of the LIU/XRAM 18. The interface buffer 14 further receives timing signals from ADP 16. These signals comprise two of the eight sequential clock signals C$\phi$0 and CT3, and the read/write signals CDBCMEN and CCMWREN Because some of the components of the LIU/XRAM 18 use emitter controlled logic (hereinafter "ECL") which is inherently fast but produces less noise than Schottky devices, the interface buffer 14 comprises a plurality of translators 32-44. The translators 32-44 are used for converting the logic levels associated with the outputs from the ADP 16 into those which may h=used by the LIU/XRAM 18. The translator 32 receives information from the PMD bus and delivers this information to the XRAM 20 through a translator 46 when a dump operation occurs. The output from the translator 32 which is delivered to the XRAM 20 is a 24-bit word represented as LPM 0-23. In addition, the translator 34 receives 24-bit word LPXM 0-23 from the XRAM 20 through a translator 48 which is then delivered to the PMD through the ECL driver 50. The driver 50 is used for controlling when the information contained in the XRAM 20 is to be delivered to the program memory of the missile 12 through the PMD bus. If the LPMTEST output from the computer interface 28 which is delivered to the OR gate 55 through the translators 36 and 76 is high, the OR gate 55 generates an enabling signal to the driver 50 which allows information from the XRAM 20 to be delivered to the PMD bus. In addition, upon receipt of an CINT signal from the ADP 16, the driver 50 is also enabled causing information from the XRAM 20 to be delivered to the ADP 16.

To allow the LIU 30 to interface with either the ADP 16 or the ADP simulator 22, a first ECL multiplexer 52 is provided. The multiplexer 52 receives 16-bit words, represented as LDB 0-15, from the OMD bus through the translator 42 and the ECL differential to single-ended receiver 54. In addition, the multiplexer 52 also receives some of the TIMING signals (e.g., C$\phi$0 and CT3 clock signals) from the ADP 16 through the translator 44 and the ECL differentual to single-ended receiver 56. The multiplexer 52 further receives 13-bit words, represented as LOMADD 0-12, from the OMA bus through the driver 58, the translator 40, and the ECL differentual to single-ended receiver 60. Similarly, the multiplexer 52 also receives operand memory-address and operand memory-data signals as well as timing signals from the ADP simulator 22 through the translators 62-66. The output from the multiplexer 52 which is delivered to the LIU 30 can therefore represent the operand memory-address and operand memory-data information from the ADP 16, or the operand memory-address and operand memory-data information from the ADP simulator 22.

To allow program memory-address information generated by the ADP 16 or the ADP simulator 22 to be delivered to the XRAM 20, a second ECL multiplexer 68 is provided. The second ECL multiplexer 68 receives information from the PMA bus of the ADP 16, represented as LPMADD 0-15, through the translator 38 and a receiver 70 which acts as a ECL differentual to single-ended driver. In addition, the multiplexer 68 also receives program memory-address information from the ADP simulator 22 through the translator 72. Because the XRAM 20 communicates with a multiplexer 68 through the translator 74, XRAM 20 may receive program memory-address information from either the ADP 16 or the ADP simulator 22. In addition, the program memory-address information generated at the output for the multiplexer 68 is also delivered to the LIU 30 may also be used in the manner described below.

The computer 24 may be used to sequentially examine the contents of the OMD or the PMD in a step-by-step fashion. To allow the computer 24 to perform this function, the XRAM 20 electrically communicates with the PMA and OMA buses through the translator 78, the drivers 80 and 82, as well as the counter 84. When the user selects to sequentially examine the OMD or the PMD buses, the computer 24 generates a LADDRCKL signal which controls the PMA or the OMA buses through the drivers 80 and 82. Upon receipt of the LADDRCLK signal, the respective data contents of the program memory or the operand memory are delivered to the oMA bus or the PMA bus. When the user selects to receive the information propagating in either the OMD or PMD buses, the information on the OMD or PMD buses is then delivered to the computer 24 through the computer interface 28. The LADDRCLK signal increments the counter 84 so that the contents of the operand or program memories may be sequentially placed on the PMD or OMD buses respectively.

Figure 3A:
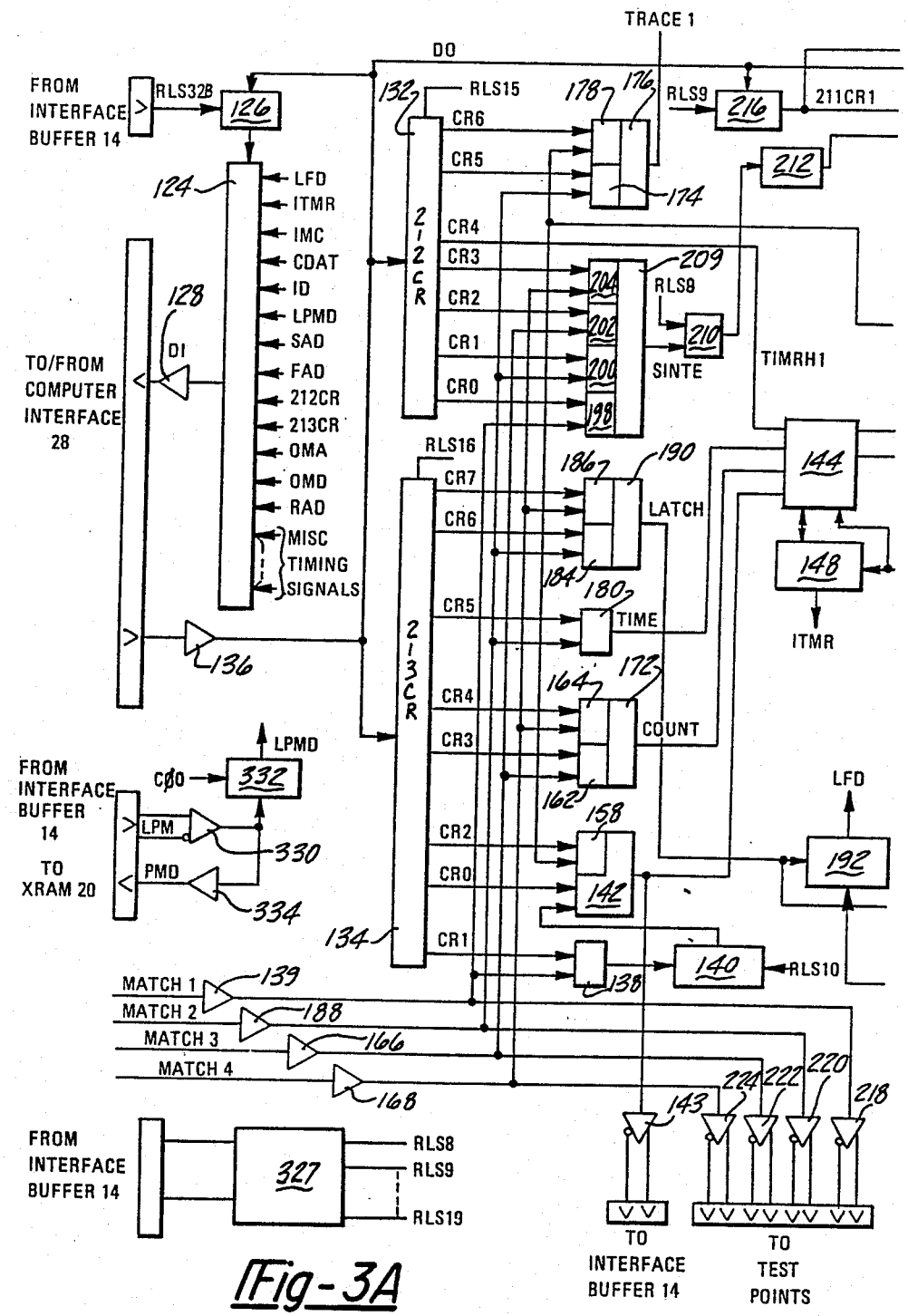
FIGS. 3A-4B are diagrammatic illustrations of the logical interface unit shown in FIG. 2.
Figure 3B:
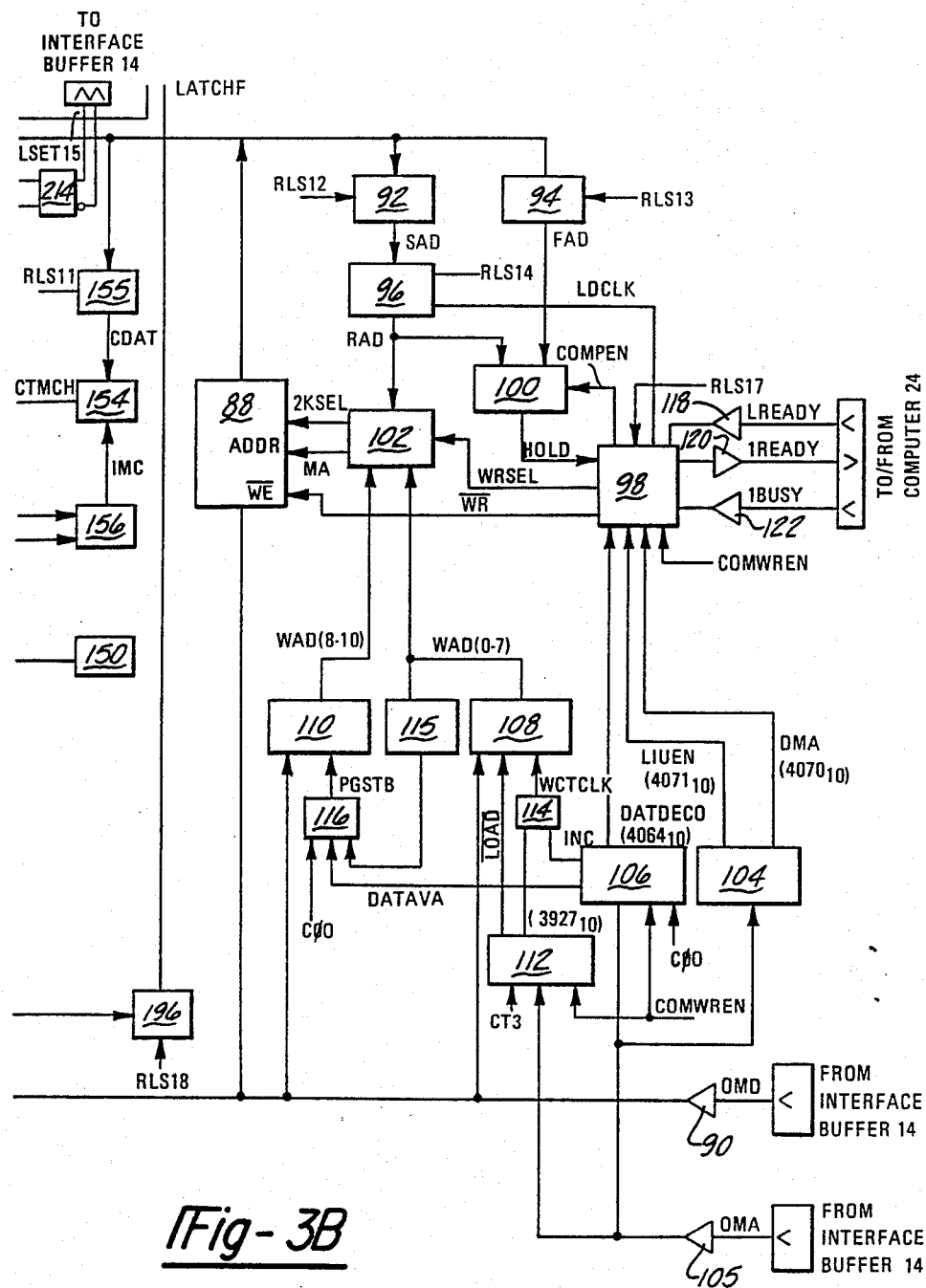
Figure 4A:
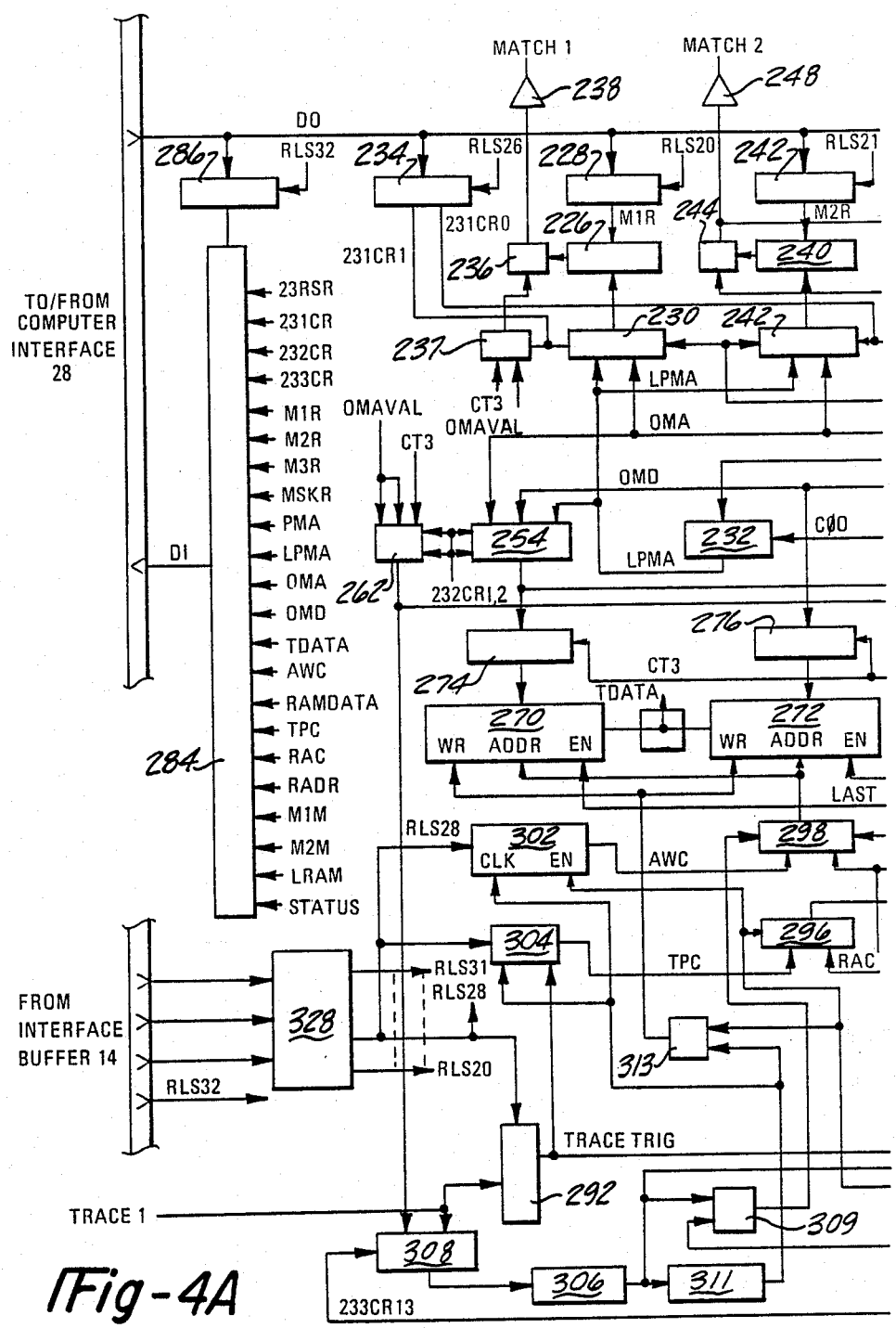
Figure 4B:
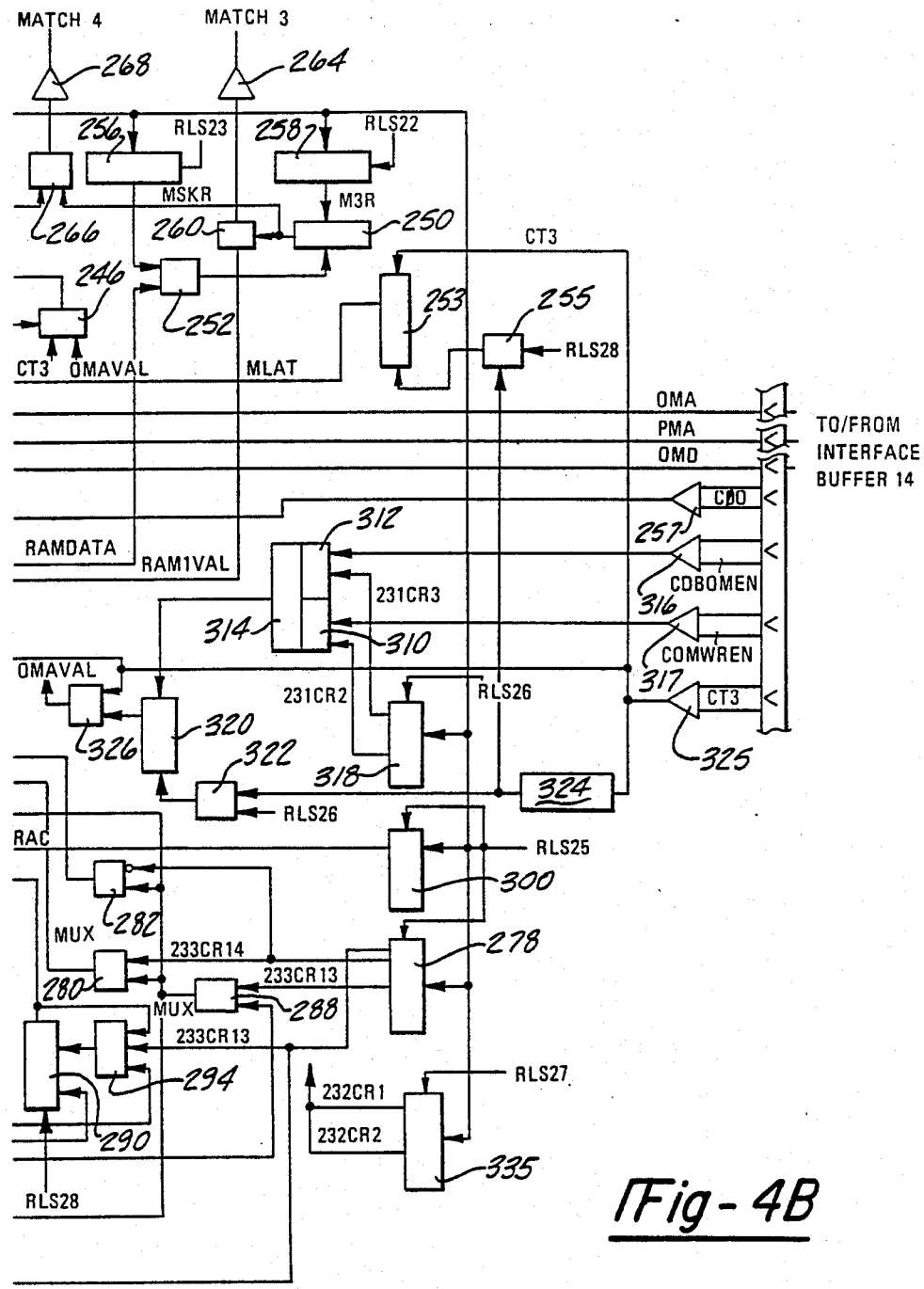
Figure 5:
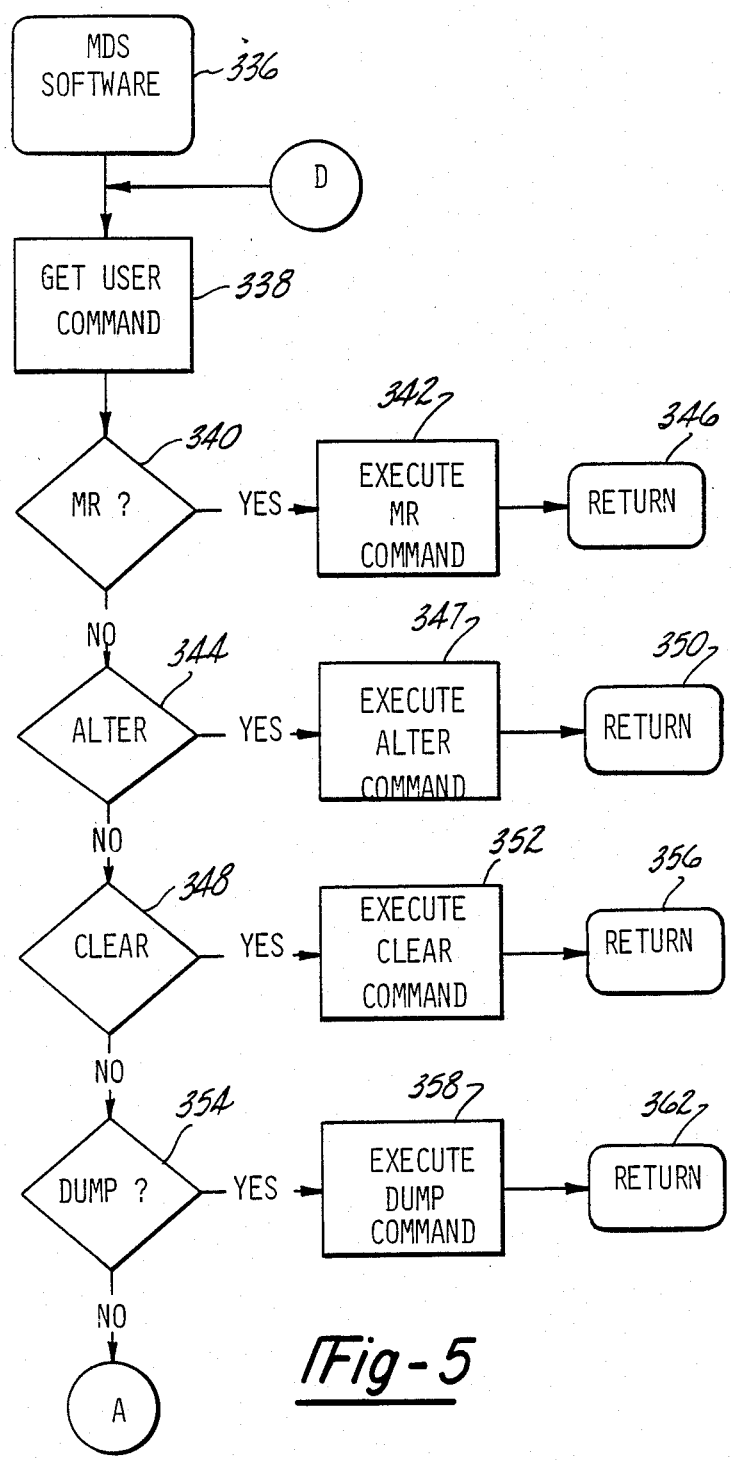
FIGS. 5-8 are diagrammatic illustrations of the method for testing missile systems in accordance with the teachings of the preferred embodiment of the present invention showing the library routines which may be used to write test programs.
Figure 6:
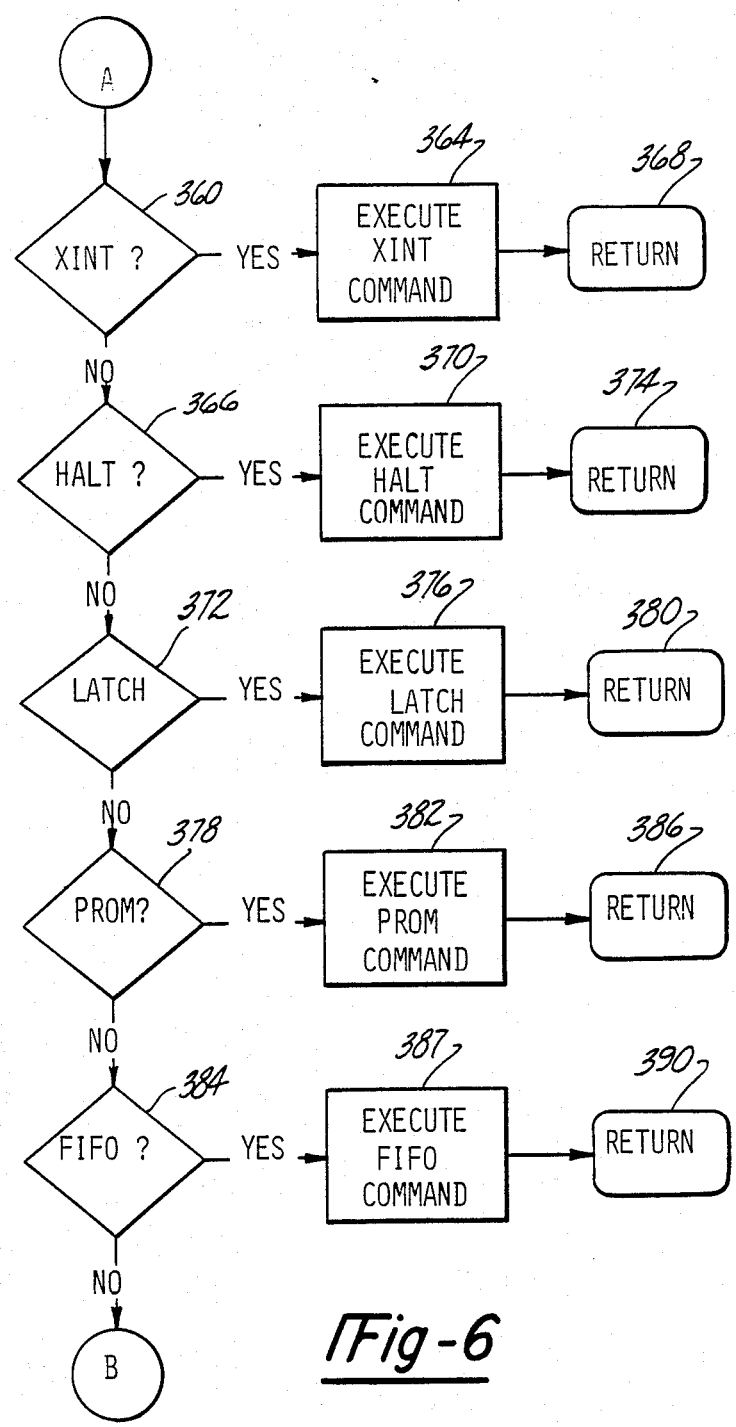
Figure 7:
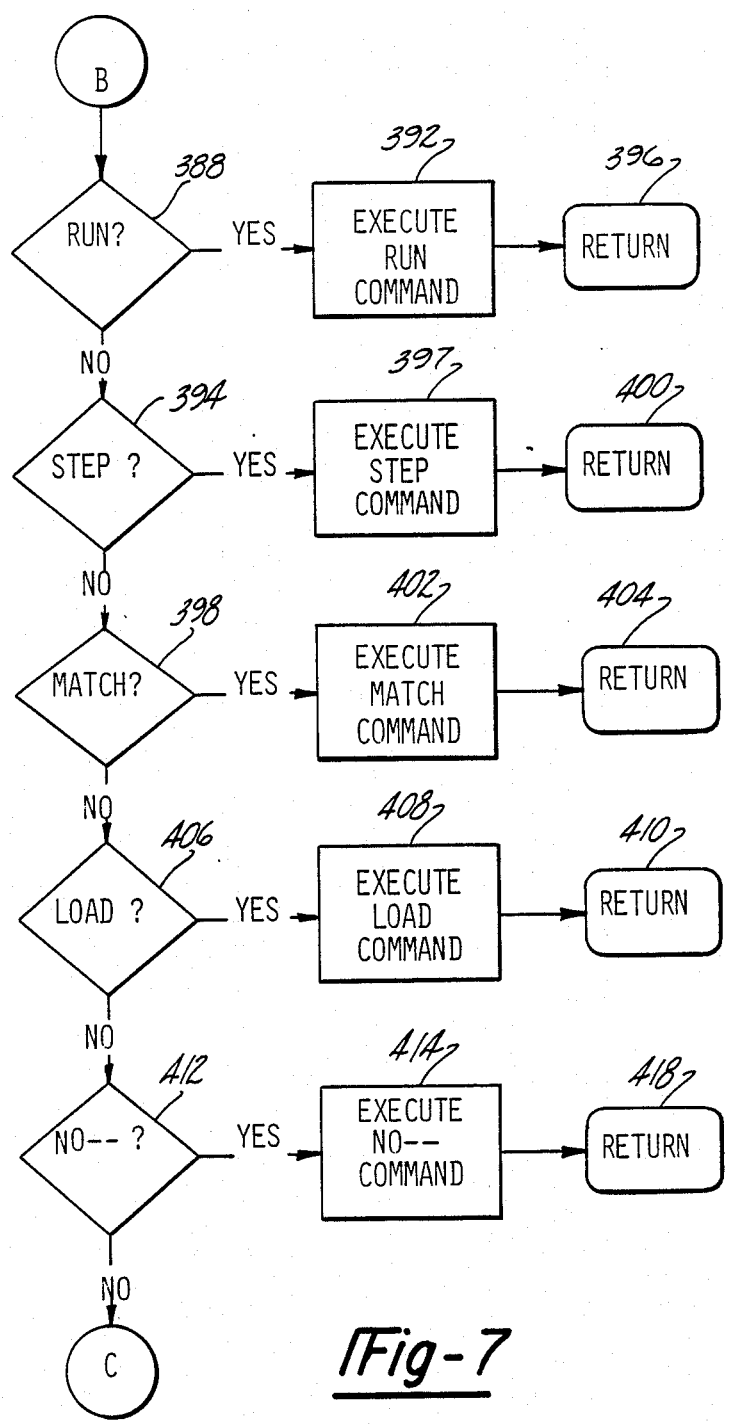
Figure 8:
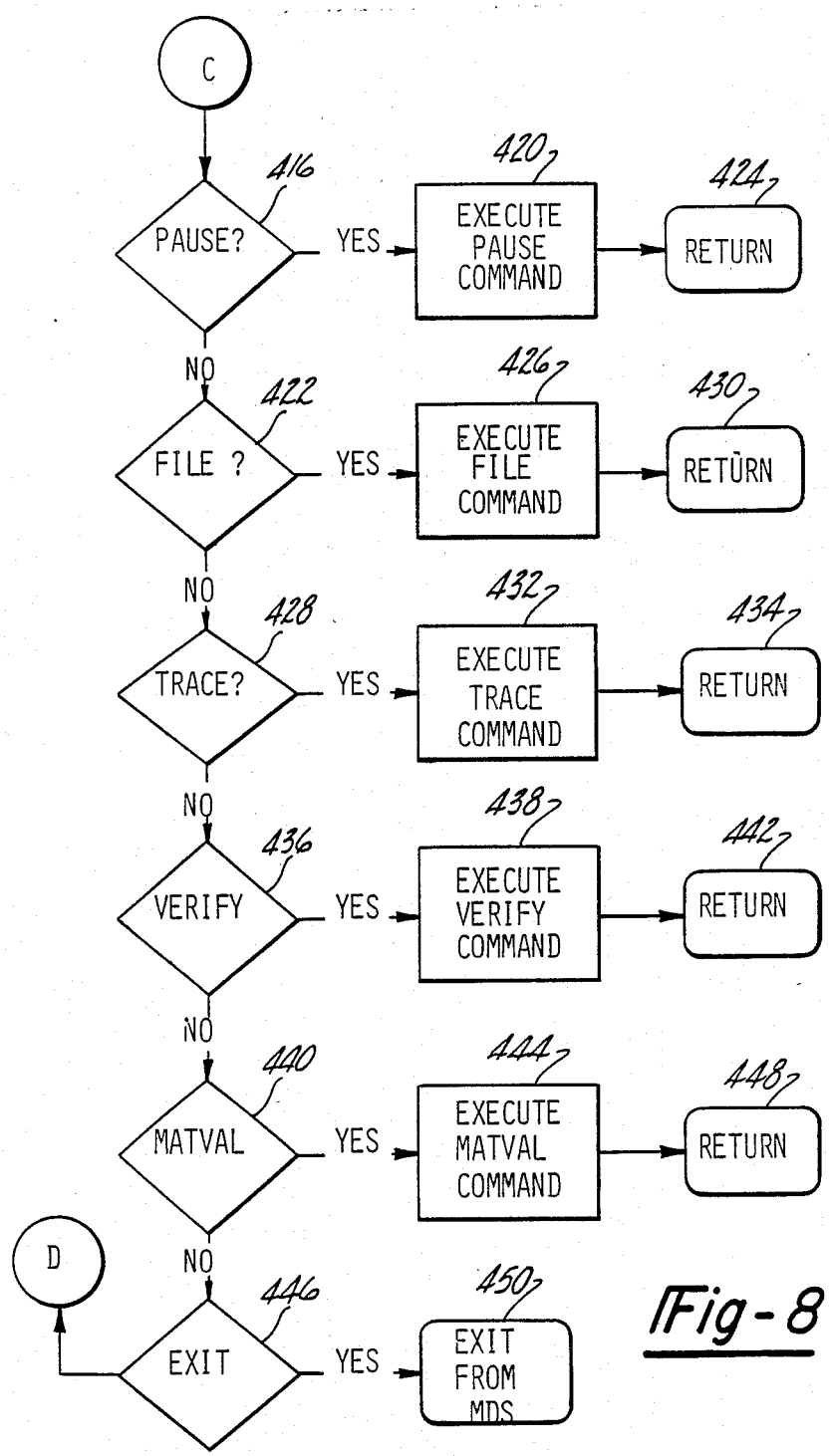

To collect information which appears on the OMA bus, the LIU 30 comprises a random access memory 88 as shown in FIG. 3(B). The random access memory 88 contains 2K words of random access storage, and receives the output from the OMD bus through a driver 90. To identify the starting and stopping addresses from which the contents of the memory 88 are to be read, a start address register 92 and a final address register 94 are provided The start address register 92 is used to store the starting address at which contents of the memory 88 are to be read from the memory 88, which is delivered to the start address register 92 from the data output bus DO upon generation of an RLS12 control signal. The SAD output from the starting address register 92 is delivered to a counter 96 which sequentially increments the address initially stored in the starting address register 92 upon receipt of an RLS14 control signal In a similar fashion, the final address register 94 is used to store the final address which is to be read from the memory 88. The final address is loaded into the final address register 94 from the data output bus DO upon delivery of an RLS13 control signal. The RAD output from the counter 96 as well as the FAD output from the final address register 94 is delivered to a comparator 100. Upon receipt of an enabling COMPEN signal from a direct memory access control logic circuit 98, the comparator 100 determines whether the final address has been reached by comparing the RAD output of the counter 96 with the FAD output from the final address register 94. If the final address has been reached, the comparator 100 generates a HOLD control signal which instructs the direct memory access control logic circuit 98 to transfer the contents of the memory 88 to the computer 24 in the manner described below. The output from the counter 96 is also delivered to an address multiplexer 102 which delivers the 2KSEL and MA outputs to the memory 88 which are used to select the address location from which information in the memory 88 is to be read.

To provide addressing information to the memory 88 when information is to be written into the memory 88, a direct memory access mode decode circuit 104 and a data acquisition system data decode 106 is provided. The direct memory access mode decode circuit 104 is used to generate enabling LIUEN output or a disabling DMA output for the direct memory access control circuit 98 depending on whether the base 10 value of the information on the OMA bus received through the driver 105 is either 4071 or 4070 respectively. The data acquisition system data decode circuit 106 is used for generating enabling DATDECO, INC and DATAVAL signals whenever a COMWREN write signal is received from the ADP 16 or the simulator 22, and the information appearing in the OMA bus through the driver 105 has a base 10 value of 4064 indicating a write operation is to take place.

To deliver the address information to the memory 88 during a write operation, a tag counter 108 and a three-bit page latch 110 are provided. The tag counter 108 receives eight bits from the OMD bus and therefore is able to access information contained within a particular 256 location page in the memory 88. The address information on the OMA bus is stored to the tag counter 108 when an enabling LOAD signal is received from a tag decode circuit 112. The tag decode circuit 112 is used for enabling the tag counter 108 when the ADP 16 issues a CCMWREN command and the information appearing on the OMA bus received through the driver 105 has a base 10 value of 3927. The address information in the tag counter 108 is incremented by the WCTCLK output from the OR gate 114 upon receipt of the INC output from the data acquisition system data decode circuit 106 or by an output from the tag decode circuit 112 when the information appeared on the OMA bus as a base 10 value of 3927. The three-bit page latch 110 receives three bits of information from the OMD bus to indicate which page the particular information appearing on the OMD bus is to be written Accordingly, the address multiplexer 102 receives paging information from the three-bit page latch 110 and information concerning displacement within a particular page from the tag counter 108. To increment the page at which information is stored in the memory 88, a comparator 115 and an AND gate 116 are provided. The comparator 115 determines whether the output from the tag counter 108 is equal to 255 which represents the maximum displacement within a particular page an address can have. If the comparator 115 determines that the displacement has exceeded 255, the comparator 115 generates an output to the AND gate 116 which causes the AND gate 116 to deliver a PGSTB output to the three-bit page latch 110. The PGSIB output from the AND gate 116 instructs the three-bit page latch 110 to increment the page address which is to h=delivered to the memory 88 through the address multiplexer 102.

The direct memory access control logic circuit 98 communicates with the computer 24 through translators 118-122 which are used to convert the ECL logic levels of the direct memory access control logic circuit 98 to the TTL logic levels of the computer 24. The translator 118 receives an LREADY from the computer 24 which is used to indicate that the computer 24 is able to receive the information stored in the memory 88. The translator 120 delivers a 1READY from the direct memory access control logic circuit 98 to the computer 24 which is used to indicate that the direct memory access control logic circuit 98 is ready to deliver the information stored in the memory 88. The translator 122 is used to deliver a 1BUSY signal from the computer 24 to the direct memory access control logic circuit 98 which is used to indicate that the computer 24 is busy and unable to receive the contents of the memory 88. When the direct memory access control logic circuit 98 and the computer 24 are able to transfer the information stored in the memory 88, the direct memory access control logic circuit 98 delivers a $\overline{WR}$ to the $\overline{WE}$ input of the memory 88 which causes ID output of the memory 88 to be delivered to a data multiplexer 124 through a read select register 126 The ID output from the memory 88 is then delivered from the data multiplexer 124 to the computer 24 through the translator 128 upon receipt of an RLS32 control signal by the read select register 126.

As indicated above, the LIU 30 allows the computer 24 to either perform a pause, match, latch, or trace operations upon the occurrence of certain conditions. To select which one of these operations are to be performed, the 212CR 132 register and the 213CR 134 register are provided The 212CR 132 and the 213CR 134 registers receive data from the computer 24 through a driver 136, and are loaded upon delivery of the RLS15 and RIS16 control signals respectively. The contents of the 212CR 132 and the 213CR 134 are used to determine which of a plurality of signals identified as MATCH1 through MATCH4, generated in the manner described below, cause certain events to occur which then enable the LIU/XRAM 18 to perform the pause, match, latch and trace operations described above.

To cause the ADP 16 to pause when a MATCH1 operation is to be performed, an AND gate 138 is provided The AND gate 138 receives the MATCH1 signal through the driver 139 and the CR1 bit from the 213CR 134 register. If the MATCH1 signal and the CR1 bit of the 213CR 134 register are both high, the output from the AND gate 138 is high. The output from the AND gate 138 sets a pause latch 140, which may be reset upon delivery of an RLS10 control signal, thereby causing the pause latch 140 to deliver a logical high signal to the OR gate 142. The output from the OR gate 142 is delivered through the driver 143 and the interface buffer 14 to the ADP 16 which causes the ADP 16 to pause. A pause may also be generated when the CRO of the 213CR 134 register is logically high which represents an instruction from the computer 24 to halt the ADP 16. In addition, the output from the OR gate 142 is delivered to a timer/counter control logic circuit 144. The timer/counter control logic circuit 144 electrically communicates with a timer 148 which is driven by a 5 MHz oscillator 150. When the output of the OR gate 142 is received by the timer/counter control logic circuit 144 is logically high, the timer/counter control logic circuit 144 instructs the timer 148 to stop timing and generate an ITMR output indicating the time at which the pause occurred. The ITMR output from the timer 148 is then delivered to the computer 24 through the data multiplexer 124.

To allow the LIU/XRAM 18 to pause the ADP 16 after a preselected number of MATCH1 signals have been generated, a comparator 154 is provided. The comparator 154 receives the output from a match count register 155 which is loaded with a preselected number of occasions upon which a MATCH1 operation is to occur from the data output bus DO upon receipt of an RLS11 control signal A timer/counter 156 then counts the number of occurrences that a MATCH1 operation has occurred and generates a responsive IMC output which is delivered to the comparator 154. If the comparator 154 determines that the CDAT output of the match count register 155 is equal to the IMC output of the timer/counter 156, the comparator 154 generates a logically high CTMCH output which is delivered to the AND gate 158. If the value of the CR2 bit in the 212CR 132 register is also high, the output from the AND gate 158 becomes logically high thereby delivering a pause signal to the computer 24 through the OR gate 142 and the driver 135.

To allow the LIU/XRAM 18 to count the number of occurrences that the MATCH3 and MATCH4 signals have been generated, the AND gates 162 and 164 are provided The AND gate 162 receives the MATCH3 signal through the driver 166 and a CR3 bit from the 213CR 134 register Similarly, the MATCH4 signal is received by the AND gate 164 through the driver 166, as well as the output from the CR4 bit of the 213 CR 134 register. If the outputs of either of the AND gates 162 and 164 are logically high, the high signal is delivered to the counter/timer control logic circuit 144 through the OR gate 172 which instructs the timer/counter 156 to begin counting. When the output the timer/counter 156 is equal to the value stored in the match count register 155 as determined by the comparator 154, the comparator 154 generates a logical high CTMCH output which is delivered to the AND gate 158. If the CR2 bit of the 213CR 134 register is logically high, the output of the AND gate 158, and hence the output of the OR gate 142 becomes logically high. Because the output of the OR gate 142 is high, a pause signal is delivered to the ADP 16 through the driver 143 and the interface buffer 14. In addition, if the CR5 bit of the 212CR 132 register is also high, the output from the AND gate 174, and hence the OR gate 176, becomes logically high thereby generating a TRACE 1 signal which is used to initiate the trace operation in the manner described below. Accordingly, the LIU 30 may be used to pause the operation of the ADP 16 or initiate tracing after a predetermined number of MATCH3 and MATCH4 signals have been generated.

To determine the time at which a MATCH2 signal is generated, an AND gate 180 is provided. The AND gate 180 receives a MATCH2 signal as well as the CR5 bit from the 213CR 134 register. When the MATCH2 signal and the CR5 bit are high, a logically high output is delivered by the AND gate 180 to the timer/counter control logic circuit 144. The timer/counter control logic circuit 144 then causes the timer 148 to generate an ITMR output indicative of the time at which the MATCH2 signal occurred The ITMR output from the timer 148 is then delivered to the computer 24 through the data multiplexer 124.

To latch the data appearing on the OMD bus when a MATCH2 or MATCH4 signal is generated, the AND gates 184 and 186 are provided The AND gate 186 receives a CR6 bit from the 213CR 134 register as well as a MATCH4 signal through the driver 168. Similarly, the AND gate 184 receives the CR6 bit from the 213CR 134 register as well as the MATCH2 signal from the driver 188. The outputs from the AND gate 184 and 186 are delivered to an OR gate 190 which generates a LATCH output which is then delivered to a latch 192. If either of the outputs of the AND gates 184 and 186 are logically high, the OR gate 190 causes the latch 192 to store the information appearing on the OMD bus. The latch 192 is therefore able to generate an LFD output which contains the information appearing on the OMD bus when the LATCH signal was received by the latch 192. In addition, the LATCH signal from the OR gate 190 is also delivered to a flip-flop 196. The flip-flop 196 is used to generate a LATCHF output to indicate that a latching operation has occurred. The flip-flop 196 also receives an RLS18 which is used to reset the flip-flop 196.

To generate an interrupt signal upon the occurrence of either a MATCH1, MATCH2, MATCH3 or MATCH4 signals, the AND gates 198–204 are provided The AND gate 198 receives a CR0 bit from the 212CR 132 register, as well as the MATCH1 signal from the driver 139. In addition, the AND gate 200 receives the CR1 bit from the 212CR 132 register as well as the MATCH2 signal from the driver 188. Similarly, the AND gate 202 receives the MATCH3 signal as well as the CR2 bit from the 212CR 132 register, and the AND gate 204 receives the MATCH4 signal as well as the CR3 bit from the 212CR 132 register. The outputs from the AND gates 198–204 are delivered through an OR gate 209 to an OR gate 210, which in turn is connected to a 800 nanosecond pulse generator 212. The pulse generator 212 is used for generating a 800 nanosecond pulse when either of the MATCH1 - MATCH4 signals are logically high and the corresponding bit in the 212CR 132 register is also high. The output from the pulse generator 212 is delivered to one input to an AND gate 214, the other input of which is connected to the 211CR 216 register The 211CR 216 register is used to enable or disable the AND gate 214, and is loaded upon delivery of an RLS9 control signal. When the output of the 211CR 216 register and the pulse generator 212 are both high, the AND gate 214 generates a logically high LSET15 output which is delivered to the ADP 16 through the interface buffer 14. The LSET15 output from the AND gate 214 is then interpreted by the ADP 16 as an interrupt signal which halts the operation of the ADP 16. The OR gate 210 also receives an RLS8 control signal, which is used to initiate an interrupt from the computer 24 directly. To provide direct access to the MATCH1 - MATCH4 signals, the output from the drivers 166, 168, 188 and 206 are delivered to the drivers 218–224 which are connected to test points located on the housing (not shown) of the LIU/XRAM 18. The outputs from the drivers 218–224 may then be connected to an oscilloscope so that the MATCH1-MATCH4 signals may be observed.

To generate the MATCH1 signal, a comparator 226 is provided. A comparator 226 receives the output from a latch 228 which electrically communicates with the data output bus DO of the LIU 30. When an RLS20 control signal is generated, the latch 228 latches the data appearing on the data output bus DO. In addition, the comparator 226 receives the output from a multiplexer/latch 230 which receives operand memory addressing information from the OMA bus and program memory addressing information from the latch 232. A CT3 clock pulse is provided to the latch 230 through the latch 253 which electrically communicates with the OR gate 255, while the C$\phi$0 clock signal is delivered to the latch 232 through the driver 257. The latch 232 electrically communicates with the PMA bus and delivers a latched program memory addressing LPMA output to the multiplexer/latch 230. The multiplexer/latch 230 further receives the CR1 bit from the 231CR register which is loaded into the latch 234 upon delivery of a RLS26 control signal. When the comparator 226 determines that the M1R output from the latch 228 is equal to the output from the multiplexer/latch 230, a logically high output is delivered to one input of an AND gate 236. The AND gate 236 also receives the output from the multiplexer 237 which multiplexes the CT3 and the OMAVAL clock signals generated in the manner below When both inputs to the AND gate 236 are logically high, a logically high MATCH1 signal is delivered through the driver 238.

To generate the MATCH2 signal, a comparator 240 is provided The comparator 240 receives the M2R output from the latch 242 which electrically communicates with the data output bus DO. The latch 242 also receives the RLS21 control signal which is used to load addressing information from the data output bus DO into the latch 242. The comparator 240 also receives the output from a multiplexer/latch 242. The multiplexer/latch 242 receives operand memory addressing information from the OMA bus, and program memory addressing information from the latch 232. A CT3 clock signal is provided to the latch 242 through the latch 253 which electrically communicates with the OR gate 255. If the output of the multiplexer/latch 242 is equal to the M2R output from the latch 242, the logically high signal is delivered to one input of an AND gate 244. The other out to the AND gate 244 is connected to a multiplexer 246 which receives the CT3 clock signal as well as the OMAVAL clock signal generated in the manner described below. If both inputs to the AND gate 244 are logically high, the output from the AND gate 244 representing the MATCH2 becomes logically high. This output is delivered through the driver 248.

To generate the MATCH3 signal, a comparator 250 is provided. The comparator 250 receives the output from an AND gate 252 which has one input connected to a multiplexer 254. The multiplexer 254 receives information appearing on the OMA and OMD buses as well as program memory addressing information from the latch 232. The output of the multiplexer 254 is controlled by the value of the CR1 and CR2 bits of the 232CR. The other input to the AND gate 252 is from a latch 256 which receives masking information from the data output bus DO upon delivery of an RLS23 control signal. Because the outputs from both the latch 256 and the multiplexer 254 are delivered to the AND gate 252, the output from the AND gate 252 represents only those bits delivered from the multiplexer 254 which are not masked (i.e., do not correspond to zero bits) by the information in the latch 256. The comparator 250 also receives an input from latch 258 which receives the match/trace address from the data output bus DO upon the receipt of an RLS22 control signal. If the output from the AND gate 252 and the M3R output from the latch 258 are equal, the comparator 250 generates a logically high signal which is delivered to one input of the AND gate 260. The other input to the AND gate 252 receives the output from a multiplexer 262 which is generated by the OMAVAL and the CT3 clock signals in the manner described below. If both inputs to the AND gate 260 are logically high, a logically high output is delivered to the ECL driver 264 to produce a logically high MATCH3 signal.

To generate the MATCH4 signal, the AND gate 266 is provided. The AND gate 266 receives an input from the AND gate 244 as well as from the comparator 250. If both the inputs from the AND gate 266 and the comparator 250 are logically high, the AND gate 244 generates a logically high output which is delivered to the driver 268 to produce a logically high MATCH4 signal.

To store the information on the PMA, OMA and OMD buses during a trace operation, two FIFO memories 270 and 272 are provided. The FIFO memory 270 receives information appearing on either the OMA, OMD or the PMA buses from the multiplexer 254 through the latch 274, while the FIFO memory 272 receives information appearing on the OMD bus through the latch 276. The FIFO memory 270 may be read when the value of the CR14 bit of the 223CR register is high and the RLS25 control signal is generated. When this occurs, the latch 278 receives the CR14 bit from the data output bus DO and delivers the CR14 bit to the enable input of the FIFO memory 270 through the OR gate 280. Because the value of the CR14 bit is high, the FIFO memory 270 is enabled so as to generate an output identified as TDATA. Similarly, the FIFO memory 272 may he read from when the value of the CR14 bit of the 233CR register is low and the RLS25 control signal is generated. When this occurs, the latch 278 receives the CR14 bit from the data output bus DO and delivers the CR14 bit to the enabling input of the FIFO memory 272 through the inverting input of the OR gate 282 Because the value of the CR14 bit is low, the output of the OR gate 282 is high thereby producing a logically high enabling input to the FIFO memory 272. The IDATA output from the memories 270 and 272 are delivered to the computer 24 through the data multiplexer 284 upon delivery of the appropriate control signals to the latch 286.

Information which appears on the OMA, OMD and PMA buses may be written into the respective FIFO memories 270 and 272 in either of two modes: continuous trace or trigger trace. In the continuous trace mode, information is continuously written into the FIFO memories 270 and 272. In the trigger trace mode, information is written into the FIFO memories 270 and 272 only when a TRACE 1 signal has been generated in the manner described above. The continuous trace mode is selected when the RLS25 control signal has been generated which causes the CR13 bit of the 233CR register to become high when this occurs, the latch 278 receives the CR13 bit from the data output bus DO and delivers the CR13 bit to the enable input of the FIFO memory 270 through the OR gates 280 and 288. In addition, the latch 278 delivers the CR13 bit to the enabling input of the FIFO memory 272 then the OR gate 288 and the OR gate 282. Because the value of the CR13 bit is high, the FIFO memories 270 and 272 become enabled.

To enable the FIFO memories 270 and 272 when the trigger trace mode is selected, the latches 290 and 292 are provided. The latch 292 receives the TRACE 1 signal and generates a responsive TRACE TRIG output. The TRACE TRIG output of the latch 292 is then delivered to one input of the AND gate 294. The other two inputs to the AND gate 294 are the CR13 bit from the 233CR register and an output from a comparator 296 which is used to terminate the tracing operation in the manner described below. Although the CR13 bit of the 233CR register is high during tracing, the output from the AND gate 294 is logically low as the output from the comparator 296, which is used to terminate the tracing operation, is low. The output from the AND gate 294 is delivered to the input of the latch 290 which may be reset upon delivery of an RLS28 control signal. The LAST output from the latch 290 is delivered to the enabling input of the FIFO memory 270 through the OR gates 280 and 288, and to the enabling input of the FIFO memory 272 through the OR gates 282 and 288. Because the LAST output from the latch 290 is logically low when logically high signals are received by the AND gate 294 from the comparator 296, the FIFO memories 270 and 272 are disabled when a high signal is generated from the output of a comparator 296.

To control the address to which data is to be written into or read from the FIFO memories 270 and 272, a multiplexer/latch 298 is provided. The multiplexer/latch 298 electrically communicates with the addressing ports of the FIFO memories 270 and 272, and receives the read address RAC output from a latch 300 which controls the address from which information in the FIFO memories 270 and 272 are to be read. The latch 300 receives the first eight bits CR0-CR7 of the 233CR register when the contents of the 233CR register are delivered to the latch 300 when a RLS25 control signal is generated.

During a write operation, the addressing information delivered by the multiplexer/latch 298 to the FIFO memories 270 and 272 is received from a write counter 302. The write counter 302 generates a sequentially incremented AWC output which is then delivered to the FIFO memories 270 and 272 the multiplexer/latch 298. To control the write counter 302, a position counter 304 is provided. The position counter 304 is enabled upon delivery of a TRACE TRIG signal from the latch 292 and generates a TPC output in response. The TPC output of the position counter 304 is delivered to the comparator 296 which also receives the R output from the latch 300. If the TPC output and the RAC signal are equal indicating that the user specified terminal address of the write operation has been reached, the output of the comparator 296 goes logically high which is delivered to the AND gate 294. Because the other two inputs to the AND gate 294 are also high when a TRACE mode is initiated, the output from the AND gate 294 goes logically high, thereby producing a logically high LAST output from the latch 290. A logical high LAST output to the write counter 302 then disables the write counter 302 so that the AWC signal is not sequentially incremented.

Because the multiplexer/latch 298 is set by the MUX output of the OR gate 288, the multiplexer/latch 298 will be set if either the CR13 bit of the 233CR register is high, indicating a continuous trace write mode has been selected, or the LAST output from the latch 290 is low, indicating that the trigger trace write mode has been selected. To provide a clock signal for the latch 290 and the multiplexer/latch 298, a 42±8 nanosecond clock 306 is provided. The output of the clock 306 is delivered to an OR gate 309 which in turn is connected to the clock input of the multiplexer/latch 298. The clock 306 receives the output from a multiplexer 308 which in turn receives the TRACE 1 input as well as the RAM1VAL output from the multiplexer 262. The multiplexer 262 generates a RAM1VAL from the OMAVAL clock signal as well as the CT3 clock signals. The clock 306 also drives a 50 nanosecond clock 311 which provides clock impulses to the write counter 302. In addition, the output from the clock 311 also is delivered to an AND gate 313 which receives the LAST output from the latch 290. The output from the AND gate 313 is delivered to the FIFO memories 270 and 272 so as to provide clock impulses for the FIFO memories 270 and 272 during a write operation.

The OMAVAL clock signal is used as a clock signal when transferring information from the OMA bus during an OMA read or write operation. To generate the OMAVAL signal, the AND gates 310, 312 and the OR gate 314 are provided. The AND gate 312 receives the missile read pulse CDBOMEN through the receiver 316. From the latch 318 the AND gate 312 also receives the CR3 bit from the 23CR register which corresponds to an operand memory address read only operation, or an operand memory address read/write operation. In addition, the AND gate 310 receives the missile write signal COMWREN from the receiver 317, as well as the CR2 bit of the 231CR register from the latch 318 which indicates an operand memory address write only operation, or an operand memory read/write operation. If either of the outputs from the AND gates 310 and 312 is logically high, the output from the OR gate 314 becomes logically high. The output from the OR gate 314 is delivered to the set terminal of the latch 320, the reset terminal of which is connected to the OR gate 322. The OR gate 322 receives the RLS28 control signal as well as the output from a 50±8 nanosecond clock 324 which, in turn, receives the CT3 clock signals from the ADP buffer 14 through the driver 325. The output from the latch 320 is delivered to one input of an AND ga+=326, the other input of which receives the CT3 clock signal. The output of the AND gate 326 represents the OMAVAL signal which in turn is delivered to the multiplexer 262.

The RLS control signals are generated by a plurality of control strobe decode circuits 327 and 328 which electrically communicate with the computer interface module 28. The control strobe decode circuit 327 receives various control signals from the computer interface module 28 and generates the RLS8-RLS19 control signals. In addition, the control strobe decode circuit 328 receives various control signals from the computer interface module 28 and generates the RLS20-RLS31 control signals. The LIU 30 also comprises a driver 330 which receives the LPM output from the computer interface module 14 which is delivered through the latch 332 so that the program memory-data information can be delivered to the computer 24 during a wrap-around operation in which data delivered to the ADP16 by the computer 24 may be checked. In addition, the data from the driver 330 is also delivered to the XRAM 20 through the translator 334 during a dumping operation. The LIU 30 also comprises a latch 335 which is used for latching the contents of the 232CR register upon the receipt of a RLS27 control signal.

The computer 24 may run the program which is shown in the attached microfiche appendix. This program is illustrated in the flow charts which are shown in FIGS. 5-8. At step 336, the missile development software (hereinafter "MDS") is loaded and the program gets the user command at step 338. At step 340, the program determines whether the user has selected the master reset command MR. If the user command is the master reset command MR has been selected, the master reset command MR is executed at step 342 which resets the missiles data processor, the LIU 30, and all the registers. In addition, the program counter of the ADP 16 is set equal to zero. Processing then is delivered to the step 344 by the return step 346. At step 344, the program determines whether the ALTER command has been selected. If the ALTER command has been selected, the ALTER command is executed at step 347, which allows the user to patch the program memory of the ADP 16 in sequential or random locations. Control is then returned to the step 348 by the return step 350. At step 348, the program determines whether the CLEAR command has been selected. If so, the step 352 is executed which resets the ADP 16 as well as its program counter to zero. Control is then delivered to step 354 by the return step 356. At step 354, the program determines whether the DUMP command has been executed. If so, the step 358 is executed which causes the contents of the XRAM 20 to be displayed at a terminal, line printer stored on a specified disk file in the computer 24. Control is then delivered to the step 360 via the return step 362. If the XINT command has been selected at step 360, the step 364 is executed which causes an interrupt to be delivered to the ADP 16. Control is then delivered to the step 366 by means of the step 368.

The program then determines whether the HALT command has been selected at step 366. If the HALT command has been selected, the HALT command is executed at step 370 which halts the execution of the program stored in the program memory of the ADP 16. Control is then delivered to the step 372 by the return step 374. At step 372, the program determines whether the LATCH command has been specified. If the LATCH command has been specified, the step 376 is executed which enables the user to capture data appearing on the OMA, OMD or PMA buses. Control is then delivered to the step 378 by the return step 380. The step 380 then determines whether the PROM function has been designated. If so, the step 382 is executed which changes the program memory of the ADP 16 from the XRAM 20 to the PROM of the missile 12. Control is then delivered to the step 384 by the return step 386. The program then determines whether the FIFO command has been selected at step 384. If so, the FIFO is executed at step 386 which causes the data collected during the trace mode to be displayed. Control is then returned to the step 388 by the step 390.

At step 388, the program determines whether the RUN command has been selected. If the RUN command has been selected, the RUN command is executed at step 392 which allows the user to observe the pause, match, trace, or latch information which displays the data on the OMA, OMD and PMA buses. After the RUN command has been executed, the program executes the step 394 via the step 396. At step 394, the program determines whether the STEP function has been selected. If so, the STEP command is executed at step 396, which allows the user to step through the program in the ADP 16 one instruction at a time. The step 398 is then executed by means of the return step 400. At step 398, the program determines whether the MATCH command has been selected. If the MATCH command has been selected, the MATCH command is executed at step 402 which enables the user to count the number of occurrences that a specified data pattern or data source occurred, halt the ADP 16 after a specified number of occurrences of a specific data pattern or source, or trigger the TRACE function upon a match criteria. After the return step 404 has been executed, the program determines whether the LOAD command has been selected at step 406. If the LOAD command has been selected, the LOAD command is executed at step 408 which loads a program into the XRAM 20 from a user specified disk file in the computer 24. After the return step 410 has been executed, the program determines whether a NO—command has been selected at step 412. If a NO—command is selected, the program cancels the designated function and then control is delivered to the step 416 by means of the return step 418.

At step 416, the program determines whether the PAUSE command has been selected. If the PAUSE function has been selected, the pause function is executed at step 424 which halts the ADP 16 on the occurrence of either a specific program memory address, an operand address, a program, or an absolute address. After the PAUSE command has been executed, the step 422 is executed by the return step 424. At step 422, the program determines whether the FILE command has been selected. If so, the step 426 executes the FILE command which displays to the user the name of the last file used for the LOAD or VERIFY functions. Control is then returned to the step 428 by the return step 430. At step 428, the program determines whether the TRACE command has been selected. If the TRACE command has been selected, the TRACE command is executed at step 432 which permits the user to collect data in the memories 270 or 272 either continuously or triggered on a specific value. At step 434, the control of the program is delivered to the step 436. If the VERIFY function has been selected as determined by step 436, the step 438 is executed. The step 438 executes the VERIFY command which then verifies the program in the XRAM 20 against a user's specified disk file in the computer 24, or creates a patch file. Control is then returned to the step 440 by return step 442. At step 440, the program determines whether the MATVAL command has been selected. If so, the VAL command is executed at step 444 which counts the number of occurrences of a specified data pattern when the value of information in the OMD is equal to a selected value. Control is then delivered to the step 446 via return step 448. At step 446, the program determines whether the EXIT command has been entered by the user. If so, the program exits from a MDS program at step 450. If the EXIT command has not been executed, the control is delivered to the step 338.

Because the interface buffer 14 is connected directly to the OMA, OMB, PMA and PMD buses of the ADP 16, the contents of the program and operand memory may be examined while the memories are in situ (i.e., in the missile 12) so as to determine whether any damage has occurred during installation. In addition, the software may be initially loaded from the computer 24 to the XRAM 20 so that it may be tested using the XRAM 20. Further, the information which is stored in the program memory of the missile 12 may be dumped onto the XRAM 20 so that the contents of the program memory may be tested by running the programs on the ADP simulator 22. Finally, because the computer 24 may be used to control the ADP 16 through the LIU 30, the missile hardware which is controlled by the ADP 16 may be tested.

It should be understood that the invention was described in connection with a particular example thereof. Other modifications will become apparent to those skilled in the art after a study of the specification, drawings and following claims.

TABLE

| 233CR REGISTER (LOADED BY RLS25 CONTROL SIGNAL) | | | | |
|---|---|---|---|---|
| BIT POSITION | | | | |
| 15 | 14 | 13 | 12–8 | 7–0 | FUNCTION |
| 0 | X | 0 | X | X | TRIG/FREE RUN MODE TRACE |

TABLE-continued

| | | | | | |
|---|---|---|---|---|---|
| 0 | X | 1 | X | X | ARMED CONTINUOUS MODE TRACE ARMED |
| 1 | 1 | X | X | ADDR | READ FIFO MEMORY 270 |
| 1 | 0 | X | X | ADDR | READ FIFO MEMORY 272 |

271CR REGISTER (LOADED BY RLS7 CONTROL SIGNAL)

| BIT POSITION | | | | |
|---|---|---|---|---|
| 3 | 2 | 1 | 0 | FUNCTION |
| | X | | 0 | SELECT ADP AS PROCESSOR |
| | | 0 | 1 | SELECT ADP SIMULATOR AS PROCESSOR |
| | 0 | X | | XRAM IS PROGRAM MEMORY |
| | 1 | 0 | | IS PROGRAM MEMORY |
| 0 | | | | OMA/PMA ADDRESS FROM ADP (TCDBOMEN) |
| 1 | | | | OMA/PMA ADDRESS FROM COUNTER (DUMP) |
| 0 | | | | DEADMAN DISABLE |
| 1 | | | | DEADMAN ENABLE |

231CR REGISTER (LOADED BY RLS26 CONTROL SIGNAL)

| BIT POSITION | | | | |
|---|---|---|---|---|
| 3 | 2 | 1 | 0 | FUNCTION |
| X | X | X | 0 | MATCH1 ON PMA |
| X | X | X | 1 | MATCH1 ON OMA |
| X | X | 0 | X | MATCH2 ON PMA |
| X | X | 1 | X | MATCH2 ON OMA |
| O | 1 | X | X | OMA WRITE ONLY |
| 1 | 0 | X | X | OMA READ ONLY |
| 1 | 1 | X | X | OMA READ/WRITE |
| 0 | 0 | X | X | NO OPERATION |

232CR REGISTER (LOADED BY RLS27 CONTROL SIGNAL)

| BIT POSITION | | |
|---|---|---|
| 1 | 0 | FUNCTION |
| 0 | 0 | PMA, LATCHED (FIFO MEMORY 270) |
| 0 | 1 | OMA (FIFO MEMORY 270) |
| 1 | 0 | OMD (FIFO MEMORY 270) |
| 1 | 1 | NO OPERATION |

212CR REGISTER (LOADED BY RLS15 CONTROL SIGNAL)

| BIT POSITION | | | | | | | | | | |
|---|---|---|---|---|---|---|---|---|---|---|
| 9 | 8 | 7 | 6 | 5 | 4 | 3 | 2 | 1 | 0 | FUNCTION |
| | | | | | | | | | 1 | UNCONDITIONAL INTERRUPT |
| | | | | | | | | 1 | | INTERRUPT ON MATCH1 |
| | | | | | | | 1 | | | INTERRUPT ON MATCH2 |
| | | | | | | 1 | | | | INTERRUPT ON MATCH3 |
| | | | | | 1 | | | | | INTERRUPT ON MATCH4 |
| | | | | 1 | | | | | | TRACE ON MATCH2 |
| | | | 1 | | | | | | | TRACE ON COUNT MATCH |
| | | 1 | | | | | | | | NOT USED |
| | 1 | | | | | | | | | ENABLE COUNT MODE |
| 0 | | | | | | | | | | ENABLE TIMER MODE |
| | | | | | | | | 0 | 0 | TRACE FREE RUNNING |

351CR REGISTER (LOADED BY RLS33 CONTROL SIGNAL)

| BIT POSITION | | | | |
|---|---|---|---|---|
| 3 | 2 | 1 | 0 | FUNCTION |
| | | | 0 | NORMAL PDP I/O |
| | | | 1 | PDP WRAPAROUND |
| | | 1 | | NOT USED |
| | 1 | | | NOT USED |
| 0 | | | | NOT USED |
| 1 | | | | NOT USED |

211CR REGISTER (LOADED BY RLS9 CONTROL SIGNAL)

| BIT POSITION | FUNCTION |
|---|---|
| 0 | |
| 0 | INT 15 DISABLE |
| 1 | INT 15 ENABLE |

213CR REGISTER (LOADED BY RLS16 CONTROL SIGNAL)

| BIT POSITION | | | | | | | | |
|---|---|---|---|---|---|---|---|---|
| 7 | 6 | 5 | 4 | 3 | 2 | 1 | 0 | FUNCTION |
| | | | | | | | 1 | HALT ADP |
| | | | | | | 1 | | PAUSE ON MATCH1 |
| | | | | | 1 | | | PAUSE ON COUNT MATCH |
| | | | | 1 | | | | COUNT ON MATCH3 |
| | | | 1 | | | | | COUNT ON MATCH4 |
| | | 1 | | | | | | TIME ON MATCH2 |
| | 1 | | | | | | | LATCH ON MATCH2 |
| 1 | | | | | | | | LATCH ON MATCH4 |

What is claimed is:

1. An apparatus for testing missile systems, said apparatus electrically communicating with a computer and with a data processor of a missile, said processor of said missile having a plurality of memory buses, said computer for providing control signals to and for receiving data from said apparatus, said apparatus comprising:
   means for decoding said control signals to determine data to be collected in real-time;
   data processor interface buffer means for interfacing said apparatus with said data processor to provide control signals to said data processor and to receive information appearing on at least one of said memory buses, said data processor causing information to appear on at least one of said memory buses in response to said control signals; and
   means for real-time collection of data appearing on at least one of said memory buses, said means for real-time collection of data for receiving data from said at least one memory bus through said interface buffer means and for providing collected data to said computer for test and evaluation.

2. The apparatus in claim 1, wherein said means for real-time collection of data is operable to cause said computer to pause when the information appearing on at least one of said memory buses is of a predetermined value.

3. The apparatus of claim 1, wherein said means for real-time collection of data is operable to count the number of occurrences that information appearing on at least one of said memory buses is of a particular value.

4. The apparatus of claim 1, wherein said means for real-time collection of data is operable to latch information appearing on at least one of said memory buses.

5. The apparatus of claim 1, wherein said means for real-time collection of data is operable to trace information appearing on at least one of said memory buses.

6. The apparatus of claim 1, wherein said means for real-time collection of data comprises a XRAM in electrical communication with said data processor interface buffer means.

7. The apparatus of claim 1, wherein said means for real-time collection of data comprises a data processor simulator, said data processor simulator operable to simulate the output of said data processor.

8. The apparatus of claim 7, wherein said means for real-time collection of data further comprises a logical interface unit operable to permit selective collection of data from said data processor and said data processor simulator.

9. The apparatus of claim 8, wherein said means for real-time collection of data further comprises a computer interface module operable to interface said logical interface unit and said external random access memory with said computer.

10. The apparatus of claim 1, wherein said means for real-time collection of data comprises a logical interface unit.

11. The apparatus of claim 10, wherein said logical interface unit comprises a random access memory electrically communicating with said data processor interface buffer means, said random access memory operable to store information appearing on one of said memory buses when said data processor executes a write command.

12. The apparatus of claim 11, wherein said logical interface unit further comprises a first FIFO memory, said first FIFO memory being selectively operable to continuously receive information appearing on at least one of said memory buses.

13. The apparatus for claim 12, wherein said first FIFO memory is further selectively operable to receive information appearing on one of said memory buses when the information appearing on one of said buses is of a predetermined value.

14. The apparatus of claim 13, wherein said logical interface unit further comprises a second FIFO memory, said second FIFO memory being selectively operable to continuously receive information appearing on at least one of said memory buses.

15. The apparatus of claim 14, wherein said second FIFO memory is further selectively operable to receive information appearing on one of said memory buses when the information appearing on one of said buses is of a predetermined value.

16. The apparatus of claim 1 wherein said means for real-time collection of data comprises means for a storing a test program.

17. An apparatus for testing missile systems, said apparatus electrically communicating with the operand memory and the program memory of a missile data processor through a plurality of memory buses, said apparatus further electrically communicating with a computer, said apparatus comprising:
a data processor interface buffer electrically communicating with said operand memory and said program memory;
an external random access memory electrically communicating with said program memory;
a logical interface unit for collecting data from said operand memory and said program memory in real-time, said logical interface unit electrically communicating with said data processor interface buffer;
a data processor simulator operable to simulate the output of said data processor, said data processor simulator electrically communicating with said logical interface unit and said external random access memory; and
a computer interface module operable to interface said logical interface unit and said external random access memory with said computer.

18. The apparatus of claim 17, wherein said apparatus permits the contents of said program memory to be dumped onto said external random access memory.

19. The apparatus of claim 17, wherein said logical interface unit is further operable to deliver information to said data processor so that the hardware driven by said data processor may be tested.

20. The apparatus for claim 17, wherein said data processor interface buffer comprises a plurality of translators operable to convert the logic levels associated with said data processor into the logic levels associated with said external random access memory and said logical interface unit.

21. The apparatus of claim 20, further comprising a first multiplexer operable to multiplex information from said data processor and said data processor simulator, said first multiplexer electrically communicating with said logical interface unit and said external random access memory.

22. The apparatus of claim 21, wherein said apparatus further comprises a second multiplexer operable to multiplex information from said data processor and said data processor simulator, said second multiplexer electrically communicating with said logical interface unit.

23. The apparatus in claim 22, wherein said logical interface unit is operable to cause said computer to pause when the information appearing on one of said memory buses is of a predetermined value.

24. The apparatus of claim 23, wherein said logical interface unit is operable to count the number of occurrences that information appearing on one of said memory buses is of a predetermined value.

25. The apparatus of claim 24, wherein said logical interface unit is operable to latch information appearing on one of said memory buses.

26. The apparatus of claim 25, wherein said logical interface unit is operable to trace information appearing on one of said memory buses.

27. The apparatus of claim 26, wherein said logical interface unit comprises a random access memory electrically communicating with said data processor interface buffer, said random access memory operable to store information appearing on one of said memory buses when the data processor executes a write command.

28. The apparatus of claim 27, wherein said logical interface unit further comprises a first FIFO memory, said first FIFO memory being selectively operable to continuously receive information appearing on one of said memory buses.

29. The apparatus for claim 28, wherein said first FIFO memory is further selectively operable to receive information appearing on one of said memory buses when the information appearing on one of said buses is of a predetermined value.

30. The apparatus of claim 29, wherein said apparatus further comprises a second FIFO memory, said second FIFO memory being selectively operable to continuously receive information appearing on one of said memory buses.

31. The apparatus of claim 30, wherein said second FIFO memory is further operable to selectively receive information appearing on one of said memory buses when the information appearing on one of said memory buses is of a predetermined value.

32. The apparatus of claim 31, wherein said external random access memory comprises a XRAM.

33. A method for testing missile systems, said missile having a data processor electrically communicating with a memory through a plurality of memory buses said method comprising the steps of:
- providing a computer to control collection of data appearing on said memory buses in real-time;
- receiving and decoding control signals from said computer to determine information to be collected in real-time from said memory buses;
- providing control signals to said processor through an interface buffer to cause data to appear on at least one of said memory buses;
- receiving information appearing on at least one of said memory buses through said data processor interface buffer;
- collecting in real-time the information appearing on at least one of said memory buses through said data processor interface buffer; and
- delivering said information collected in real-time to said computer.

34. The method of claim 33, wherein said step of collecting in real-time the information appearing on one of said memory buses comprises the step of generating a pause signal when the information appearing on one of said memory buses is of a predetermined value.

35. The method of claim 33, wherein said step of collecting in real-time the information appearing on one of said memory buses comprises the step of generating a signal when the information appearing on one of said memory buses occurs a predetermined number of times.

36. The method of claim 33, wherein said step of collecting in real-time information appearing on one of said memory buses comprises the step of latching information appearing on one of said memory buses when the information appearing on one of said memory buses is of a predetermined value.

37. The method of claim 33, wherein said step of collecting in real-time information appearing on one of said memory buses comprises the step of tracing information appearing on one of said memory buses.

38. The method of claim 33, comprising the additional step of dumping the contents of said memory onto an external random access memory.

39. The method of claim 33, wherein said method comprises the additional step of delivering instructions from a computer to said data processor so that the hardware being driven by said data processor may be tested.

40. A system for testing a missile, said missile of the type having a data processor with a plurality of memory buses, said test system comprising;
- a computer for providing control signals to determine data to be collected from said data processor;
- a decoder for decoding said control signals;
- a data processor interface buffer means for providing control information to said data processor to cause data to appear on at least one of said memory buses; and
- means in communication with said computer and said interface buffer for real-time collection of data appearing on said at least one memory bus, said means for real-time collection of data for receiving data appearing on said memory buses through said interface buffer means, and for providing collected information to said computer.

41. The system of claim 40 wherein said means for real time collection of data comprises means for storing a test program.

42. The system of claim 40 wherein said means for real-time collection of data comprises a data processor simulator, said simulator operable to simulate the output of said missile data processor.

* * * * *